United States Patent [19]

Romano

[11] Patent Number: 4,564,728

[45] Date of Patent: Jan. 14, 1986

[54] APPARATUS FOR TESTING A TELEPHONE LINE

[75] Inventor: Robert P. Romano, Glen Ridge, N.J.

[73] Assignee: Comus International, Inc., Nutley, N.J.

[21] Appl. No.: 599,820

[22] Filed: Apr. 13, 1984

[51] Int. Cl.$^4$ .............................................. H04B 3/46
[52] U.S. Cl. ....................... 179/175.3 R; 179/175.3 F
[58] Field of Search .................. 179/175.3 R, 175.3 F, 179/175.1 R, 175.25

[56] References Cited

U.S. PATENT DOCUMENTS 3,976,849  8/1976  Champan ..................... 179/175.3 R
4,415,778  11/1983  Turner ........................... 179/175.3 F Primary Examiner—Stafford D. Schreyer
Attorney, Agent, or Firm—Arthur L. Plevy

[57] ABSTRACT

A telephone line tester comprises a bipolar LED which has coupled thereto two wires which terminate in a modular plug of the type used on a telephone subset. In this manner the plug is inserted into a telephone jack or receptacle, and if the telephone line is operating properly, one of the diodes will illuminate depending upon the polarity of the telephone lines. The illumination of the diode presents a visual indication to the consumer that the telephone line is operating correctly. In this manner the consumer may save a service call by locating the difficulty in telephone service with the telephone subset on the line.

7 Claims, 2 Drawing Figures

APPARATUS FOR TESTING A TELEPHONE LINE

BACKGROUND OF THE INVENTION

This invention relates to a telephone line tester in general and more particularly to a telephone line tester which utilizes a light emitting diode to determine whether the telephone line or the subset is at fault.

For sometime consumers are purchasing telephone subsets from many different companies and are using these subsets in place of original equipment. Conventionally, such a subset includes a connector which fits into the telephone line connector installed by a telephone company. Recently, the telephone company has been broken up into individual companies as is widely known. Based on new operating procedures, the telephone company, when receiving a service call, will charge a consumer a minimum service charge if, in fact, the subset is inoperable. In this manner, if the telephone line is functioning properly and the subset is at fault, the consumer will be charged a fee for the service call; and the telephone company will not repair the defective subset. It is, of course, apparent that the average consumer would not have any idea whether the fault in telephone service resides with the telephone line or with the subset.

Pursuant to this, the telephone company has spent a great deal of money in advising the consumer that a service charge will be made if the subset is defective. However, if the telephone line is at fault then the telephone company will repair the line at no cost to the consumer. It is, therefore, an object of the present invention to provide a simple and economical apparatus to enable a consumer to determine whether the telephone line is operating properly and hence determine that the difficulty is with the telephone sublet.

It is a further object of the present invention to provide for an extremely simple apparatus which a consumer can utilize to determine a proper operating line with a minimum of difficulty.

BRIEF DESCRIPTION OF THE PREFERRED EMBODIMENT

A telephone line tester apparatus for determining the operation of a telephone line supplying central office battery voltage and of the type terminating in a female receptacle for receiving a male receptacle associated with a telephone subset, comprising a light emitting diode having first and second terminals coupled to first and second wires, a male telephone plug coupled to said wires and adapted to coact with said female receptacle, whereby when said male telephone plug is inserted in said receptacle, said diode illuminates providing a visual indication to the user of proper operation of said telephone line.

DETAILED DESCRIPTION OF THE FIGURES

Figure 1:
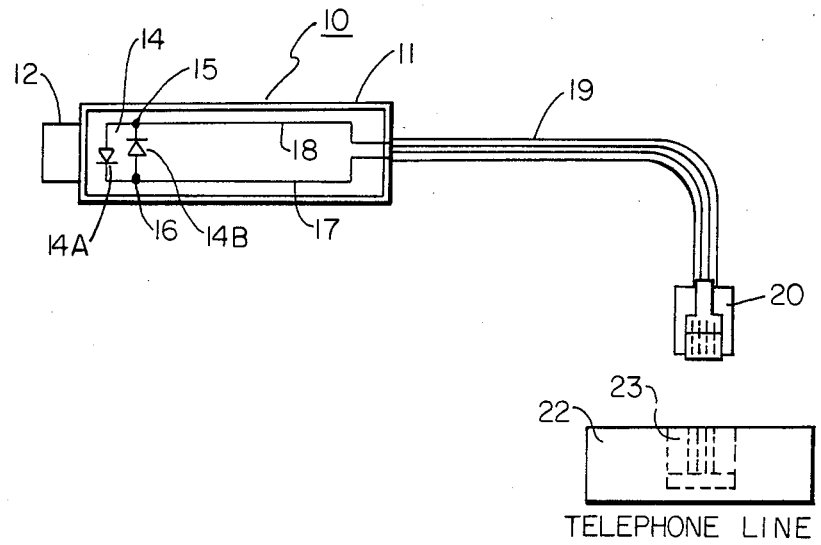
FIG. 1 is a schematic plan view of a telephone line tester according to this invention.

Referring to FIG. 1, there is shown a simple schematic diagram of a telephone line tester according to this invention.

Essentially, the tester 10 comprises a housing 11 which may be cylindrical in shape and fabricated from a suitable plastic. The front of the housing contains a clear or opaque plastic cover 12 which enables light emitted by the device to be seen by the user. The housing 11 has an internal hollow which includes a bipolar light emitting diode assembly (LED) 14.

As seen in FIG. 1, the bipolar LED comprises two parallel light emitting diodes which are arranged between terminals 15 and 16 in opposite polarity. The LED 14 is positioned in the housing near the viewing window 12. Two wires 17 and 18 are directed from terminals 15 and 16 and terminate in an elongated cable 19 which cable is terminated in a telephone plug 20.

The telephone plug 20 is exactly the same plug or connector which is found on a conventional telephone and the component is quite well known in the art. As is also known, a telephone line in most locations terminates in a housing 22 which has a female connector 23 adapted to coact with the telephone connector or plug 20. The housing 22 as wired by the telephone company contains two wires which are directed from the central office of the telephone switching system.

In the present switching system, the telephone central office supplies battery voltage to the telephone subset via the connector 23. A typical telephone battery is + or −50 VDC. Hence if a telephone line is operating properly, it will supply the 50 VDC to the telephone subset. The purpose of this is to energize the subset when the subscriber goes off hook. Hence as can be seen from FIG. 1, the consumer will remove the telephone subset from connector 23 and plug connector 20 into the receptacle 23. If the telephone line is operating properly, current will flow through one of the diodes located in the bipolar LED assembly 14. The consumer will then see the light emanating from the diode and, therefore, determine that the telephone line is intact and operating properly.

The purpose of the two diodes is to assure proper polarity. In this manner if line 18 is positive with respect to line 17 then diode 14A will illuminate. If, however, line 17 is positive with respect to line 18 then diode 14B will illuminate.

Figure 2:
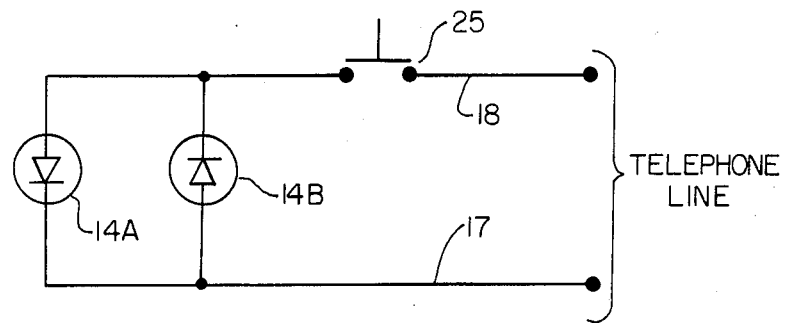
FIG. 2 is a simple schematic of an alternate embodiment.

Referring to FIG. 2, there is shown a schematic of additional circuitry which may be employed.

FIG. 2 shows a momentary switch 25 which is inserted in series with either line 17 or 18. The switch 25 may be accommodated on the housing 11, and when the consumer plugs the connector 20 into receptacle 23, he would be instructed to momentarily depress the switch 25. Upon depression of the swtich 25, either diode 14A or 14B would illuminate as above described. Hence according to the circuit shown in FIG. 2, the consumer could not tie up a telephone line or busy the line by inadvertently failing to remove the tester.

Thus as can be seen from the above, the entire unit is extremely simple to construct and will inform a typical consumer as to the operation of the telephone line. The entire unit is extremely economical and will enable an average consumer to test a telephone line simply before proceeding to have repairs made on the subset and without incurring the service charge now imposed by the telephone company.

It is, of course, understood that a series resistor may be placed in series with lines 17 or 18 to limit the current as desired. As indicated, the device is reliable and is simple to use and to construct and alleviates a substantial problem which now exists due to the breakup of the telephone company.

I claim:

1. A telephone line tester apparatus for determining the operation of a telephone line supplying central office battery voltage and of the type terminating in a female receptacle for receiving a male receptacle associated with the telephone subset, comprising:
   a light emitting diode wherein said light emitting diode is a bipolar light emitting diode consisting of a first light emitting diode in parallel with a second light emitting diode of opposite polarity having first and second terminals coupled to first and second wires,
   a male telephone plug coupled to said wires and adapted to coact with said female receptacle, whereby when said male telephone plug is inserted in said receptacle, said diode illuminates providing a visual indication to the user of proper operation of said telephone line, independent of the polarity of the central office battery as coupled to said telephone plug.

2. The telephone line apparatus according to claim 1 further including a momentary operated switch positioned in series with one of said wires and operative to close when actuated to cause said light emitting diode to illuminate when said switch is operated.

3. A telephone line tester apparatus for determining the operation of a telephone line supplying central office battery voltage and of the type terminating in a female receptacle for receiving a male receptacle associated with a telephone subset, comprising
   a hollow housing having a front surface of a material suitable for passing light rays,
   a bipolar light emitting diode array located in said housing and positioned near said front surface, said array having first and second terminals,
   first and second wires coupled respectively to said first and second terminals and directed out of said housing,
   a male telephone plug connected to said wires and adapted to be inserted into said female receptacle to cause said bipolar array to illuminate indicative of said telephone line supplying an operating potential and independent of the polarity of said potential.

4. The telephone line tester apparatus according to claim 3 wherein said housing is cylindrical in cross section.

5. The telephone line tester apparatus according to claim 4 wherein said housing is fabricated from plastic.

6. The telephone line tester apparatus according to claim 5 further including a momentary operated switch in series with one of said first and second wires and operable to close when activated to cause said array to illuminate when said switch is operated.

7. The telephone line tester apparatus according to claim 3 wherein said bipolar array consists of a first light emitting diode in parallel with a second light emitting diode of opposite conductivity.

* * * * *